Patented June 13, 1944

2,351,346

UNITED STATES PATENT OFFICE 2,351,346

PYROLYSIS

Joy G. Lichty, Stow, Ohio, assignor to Wingfoot Corporation, Akron, Ohio, a corporation of Delaware No Drawing. Application June 13, 1942, Serial No. 446,938

2 Claims. (Cl. 260—544)

This invention relates to the production of a dihaloacrylyl halide by pyrolysis of the trihalopropionyl halide. It includes the reaction product.

The pyrolysis of this invention proceeds according to the following equation:

$$CH_2Cl.CCl_2.COCl \rightarrow CHCl:CCl.COCl + HCl$$

Trichloroethylene, $CHCl:CCl_2$, has been identified as a by-product often accompanying the production of the dichloroacrylyl chloride. When trichloroethylene or another trihaloethylene is formed, other products must be formed, such as carbon, oxides of carbon, hydrogen or water. Of these possible products only carbon has been isolated. The dichloroacrylyl chloride has been obtained in yields up to 85% or better.

The following examples are illustrative of the process of pyrolysis. Although the examples refer more particularly to the treatment of the chloro compound, the process is equally applicable to the bromo compound. The compounds may contain mixed halogens, as dichloroacrylyl bromide, or dibromoacrylyl chloride.

Preparation of trichloropropionyl chloride

Trichloropropionyl chloride may be made according to either of the following reactions:

(1) 

(2) 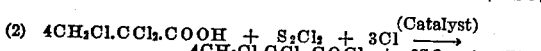

For example, following the first reaction, a solution of 20 cc. of dimethyl aniline, 374 grams or trichloropropionic acid and 420 cc. of thionyl chloride are heated for at least three hours on a steam bath under a reflux. Following the second reaction, a suspension of 48 grams of zinc chloride or other catalyst in a solution of 332 grams of sulfur monochloride in 355 grams of trichloropropionic acid are stirred and heated at 70–85° C. under a reflux for perhaps 20 hours while chlorine is bubbled into the mixture. The trichloropropionyl chloride has a boiling point of 63–5° C. at 28 mm. This compound and the aforesaid methods of preparing it are described and claimed as new in application Serial No. 459,300, filed Sept. 22, 1942.

Example 1

The apparatus used comprises a glass tube ⅞ of an inch in diameter. This was heated by insertion in a heavy iron cylinder, 20 inches long, which was wrapped by resistance wire. The glass tube was filled with Berl saddles. This tube was placed in a vertical position and trichloropropionyl chloride was fed in at its top. The exit gases passed through efficient condensers to remove the liquid products.

Trichloropropionyl chloride was introduced into the above apparatus at the rate of 4 to 5 grams per minute at a pressure of 200 mm. and at a temperature of 500° C., determined by a thermo-couple placed in contact with the outside of the tube. Distillation of the product, after passing through the tube, yielded the dichloroacrylyl chloride which boils at about 76° C. at a pressure of 60 m.m.

Example 2

The apparatus used in this example was a 2-inch glass tube heated by resistance wire wrapped around an iron cylinder, 40 inches long, in which the glass tube was inserted. Approximately 10 inches of the upper portion of the tube was packed with Berl saddles. The tube was heated to a temperature of 500–515° C., as indicated by a thermo-couple placed in the center of the tube.

Trichloropropionyl chloride was passed through this apparatus at the rate of 10 to 12 c.c. per minute at atmospheric pressure. The liquid drawn off from the bottom of the tube, on distillation, yielded a small amount of trichloroethylene, some undecomposed trichloropropionyl chloride and a large yield of dichloroacrylyl chloride.

The above examples are only illustrative. The conditions of the reaction may vary. As the examples show, the pressure need not be atmospheric. Pressures less than atmospheric are preferred. The temperature may vary from, for example, about 400° C. up to perhaps 550° C.

What I claim is:

1. The method of converting a trihalopropionyl halide from the class consisting of the chlorine and bromine derivatives to the corresponding dihaloacrylyl halide which comprises pyrolyzing the trihalopropionyl halide to separate one mol of hydrogen halide therefrom.

2. The method of producing dichloroacrylyl chloride which comprises pyrolyzing trichloropropionyl chloride to separate one mol of hydrogen chloride therefrom.

JOY G. LICHTY.